United States Patent
Shiiki et al.

(10) Patent No.: US 6,245,437 B1
(45) Date of Patent: *Jun. 12, 2001

(54) GAS-BARRIER COMPOSITE FILM

(75) Inventors: Zenya Shiiki, Narashino; Yukichika Kawakami, Iwaki; Nobuo Sato, Iwaki; Mitsuru Hoshino, Iwaki; Toshitaka Kouyama, Iwaki, all of (JP)

(73) Assignee: Kureha Kagaku Kogyo K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/230,152

(22) PCT Filed: Jun. 23, 1997

(86) PCT No.: PCT/JP97/02164

§ 371 Date: Jan. 19, 1999

§ 102(e) Date: Jan. 19, 1999

(87) PCT Pub. No.: WO98/03334

PCT Pub. Date: Jan. 29, 1998

(30) Foreign Application Priority Data

Jul. 19, 1996 (JP) .................................................... 8-207569

(51) Int. Cl.⁷ ........................... B32B 27/08; B32B 27/32; B32B 27/34; B32B 27/36; B32B 27/40
(52) U.S. Cl. ....................... 428/483; 428/36.6; 428/36.7; 428/412; 428/423.7; 428/475.2; 428/480; 428/910; 528/354; 528/361; 528/425
(58) Field of Search ..................................... 428/480, 910, 428/36.6, 36.7, 412, 423.7, 475.2; 528/354, 425, 503, 361; 156/244.11, 308.2; 427/407.1

(56) References Cited

U.S. PATENT DOCUMENTS 4,424,242 * 1/1984 Barbee .................................... 428/35
5,830,991   11/1998 Shiiki et al. .
5,853,639 * 12/1998 Kawakami et al. ............ 264/177.19
5,908,917 *  6/1999 Kawakami et al. ................. 528/354

FOREIGN PATENT DOCUMENTS 3-266643   11/1991 (JP) .
4-197634    7/1992 (JP) .

OTHER PUBLICATIONS

Schmitz, Peter et al., "Films." Ullmann's Encyclopedia of Industrial Chemistry, 5th Ed., vol. A11, pp. 91, 93, 108, Jan. 1988.*

* cited by examiner

Primary Examiner—Vivian Chen
(74) Attorney, Agent, or Firm—Dinsmore & Shohl LLP

(57) ABSTRACT

A composite gas barrier film having a layer structure comprises a thermoplastic resin film laminated on at least one side of a film formed from polyglycolic acid containing at least 60 wt. % of a repeating unit represented by the following formula (1):

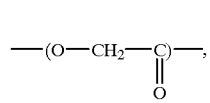

wherein the polyglycolic acid film is a film formed from polyglycolic acid having a melt viscosity, η* of 500 to 100,000 Pa•s as measured at a temperature of the melting point of the polymer +20° C. and a shear rate of 100/sec, a melting point Tm of at least 150° C., and a melt enthalpy, ΔHm of at least 20 J/g. An adhesive layer is provided between the polyglycolic acid film and the thermoplastic resin film. The film has excellent oxygen gas barrier property and/or carbon dioxide gas barrier property.

17 Claims, No Drawings

GAS-BARRIER COMPOSITE FILM

TECHNICAL FIELD

The present invention relates to composite gas barrier films, and more particularly to composite films which comprise in combination a thermoplastic resin film such as a polyolefin film, and a polyglycolic acid film, and by which the oxygen gas barrier property and/or carbon dioxide gas barrier property of the thermoplastic resin film is markedly improved. The composite gas barrier films according to the present invention are particularly suitable for various kinds of packaging materials.

BACKGROUND ART

Various kinds of resin-made packaging materials have heretofore been used for resin-made packaging various food or goods. Such resin-made packaging materials include those making use of, for example, films of thermoplastic resins such as polyolefin, polyester, polystyrene and polyvinyl chloride. Since these resin-made packaging materials are generally insufficient in gas barrier properties such as oxygen gas barrier property and carbon dioxide gas barrier property, however, they are unsatisfactory for applications to especially food packaging materials (packaging materials for meat, fishes and shellfishes, dairy products, pickles, miso, confectionery, tea•coffee, noodles, rice, etc.), toiletry packaging materials, drug packaging materials, etc. In order to improve the gas barrier properties of such resin-made packaging materials, there have thus been developed composite films in which a gas barrier film composed of an ethylene vinyl alcohol copolymer (EVOH) or polyamide is combined therewith.

However, the films formed of EVOH or polyamide are impaired in gas barrier properties to a great extent under high-temperature and high-humidity conditions. Therefore, the conventional composite films containing these films have been insufficient for packaging materials for food and goods which require a treatment under high-temperature and high-humidity conditions, such as retorting, food and goods which particularly require a long-term storage, and the like.

In recent years, biodegradable polymers, for example, polylactic acid, polysuccinates, polycaprolactone, etc. have attracted attention as plastic materials which scarcely impose burden on the environment. Packaging material making use of these biodegradable polymers are also going to be developed. However, films of these biodegradable polymers are insufficient in gas barrier properties such as oxygen gas barrier property and carbon dioxide gas barrier property. When these films are combined with the conventional EVOH or polyamide film to improve their gas barrier properties, a problem of increasing burden on the environment has arisen.

Recently, the present inventors succeeded in producing films having excellent gas barrier properties from polyglycolic acid. However, only a single layer of the polyglycolic acid film is not always sufficient in, for example, heat sealability, moisture resistance, mechanical strength, profitability, etc.

DISCLOSURE OF THE INVENTION

It is an object of the present invention to provide a composite gas barrier film suitable for use as a packaging material for food and goods which require a treatment under high-temperature and high-humidity conditions, such as retorting, food and goods which require a long-term storage, and the like.

Another object of the present invention is to provide a composite film far excellent in oxygen gas barrier property and carbon dioxide gas barrier property.

A further object of the present invention is to provide a composite gas barrier film which scarcely imposes burden on the environment.

The present inventors have carried out an extensive investigation with a view toward overcoming the above-described problems involved in the prior art. As a result, it has been found that a polyglycolic acid film is combined with a thermoplastic resin film, whereby a composite film, by which the oxygen gas barrier property and/or carbon dioxide gas barrier property of the thermoplastic resin film is markedly improved, is obtained.

When in the conventional composite gas barrier film having a layer structure of, for example, polyolefin/gas barrier resin/polyolefin, a polyglycolic acid film is used in place of the film of the gas barrier resin such as EVOH or polyamide, a composite film having sufficient properties for a packaging material for food and goods which require a treatment under high-temperature and high-humidity conditions, and food and goods which require a long-term storage can be obtained. When the film of the gas barrier resin such as EVOH or polyamide is used in combination with the polyglycolic acid film, a composite film markedly improved in not only oxygen gas barrier property but also carbon dioxide gas barrier property can be obtained.

When a film of a biodegradable polymer such as polylactic acid, polysuccinate or polycaprolactone is combined with the polyglycolic acid film, a composite film excellent in gas barrier properties and profitability can be obtained without impairing biodegradability (decomposability in soil).

The present invention has been led to completion on the basis of these findings.

According to the present invention, there is thus provided a composite gas barrier film having a layer structure that a thermoplastic resin film is laminated on at least one side of a film formed from polyglycolic acid containing at least 60 wt. % of a repeating unit represented by the following formula (1):

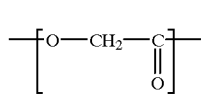

(1)

The thermoplastic resin film may preferably be a film formed from a thermoplastic resin selected from the group consisting of polyolefin, polyester, polystyrene, polyvinyl chloride, polycarbonate, polyamide, polyurethane, ethylene.vinyl alcohol copolymer, polyvinylidene chloride, polylactic acid, polysuccinate and polycaprolactone. In the composite gas barrier film according to the present invention, at least one of the oxygen gas transmission rate and carbon dioxide gas transmission rate of the composite film as determined at 23° C. and 80% relative humidity (RH) may be reduced to at most a half of that of the thermoplastic resin film to be combined.

The thickness of the polyglycolic acid film may be generally 1 μm to 2 mm, and the thickness of the composite gas barrier film may be generally 2 μm to 3 mm. In the composite gas barrier film according to the present invention, an adhesive layer may be optionally provided to improve interlayer adhesion.

BEST MODE FOR CARRYING OUT THE INVENTION

Layer Structure of Composite Gas Barrier Film

The composite gas barrier films according to the present invention are multi-layer films comprising at least one thermoplastic resin film (hereinafter may be referred to as "base film") and a polyglycolic acid film. As needed, an adhesive layer may be provided between the individual layers. The total thickness of the composite gas barrier film is generally 2 μm to 3 mm, preferably 5 μm to 2 mm, more preferably 10 μm to 1 mm. If this thickness is smaller than 2 μm, such a composite film is difficult to produce, and so results in increase in its production cost. It is hence not preferable to produce such a composite film from the viewpoints of productivity and profitability. If the thickness exceeds 3 mm, it is difficult to subject such a composite film to secondary processing for using it as a packaging material, and the cost of the packaging material becomes increased. It is hence not preferable to produce such a composite film from the viewpoints of productivity and profitability.

The basic layer structures of the composite gas barrier films according to the present invention are as follows. However, these layer structures are indicated with optional adhesive layer(s) omitted. The polyglycolic acid is abbreviated as PGA.

(1) Thermoplastic resin/PGA;

(2) Thermoplastic resin 1/PGA/Thermoplastic resin 1; and (3) Thermoplastic resin 1/PGA/Thermoplastic resin 2.

In the composite gas barrier films according to the present invention, various thermoplastic resin films of the same or different kind may be additionally laminated according to properties required so far as any one of the above-described basic layer structures is provided. No particular limitation is imposed on the method for combining the thermoplastic resin film with the polyglycolic acid film. Various lamination processing methods, for example, ① a method of separately producing individual films and then laminating the films on each other, ② a method of coating one film with a resin of the other film by extrusion, ③ a method of co-extruding the respective resins into a laminate, etc., may be adopted.

Thermoplastic Resin Film

Preferable examples of the thermoplastic resin films useful in the practice of the present invention include films formed from thermoplastic resins, for example, polyolefin resins such as very low density polyethylene (VLDPE), linear low density polyethylene (LLDPE), low density polyethylene (LDPE), medium density polyethylene (MDPE), high density polyethylene (HDPE), polypropylene (PP), ethylene.propylene rubber (EPM), ethylene.vinyl acetate copolymers (EVAs), ethylene-acrylic ester copolymers (EEAs) and ionomers (IOs); polyester resins such as polyethylene terephthalate (PET) and polyethylene naphthalate (PEN); polystyrene resins such as polystyrene (PS), high impact polystyrene (HIPS), styrene.butadiene. styrene block copolymers (SBSs) and hydrogenated SBSs (i.e., SEBSs); polyvinyl chloride (PVC) resins such as rigid polyvinyl chloride and flexible polyvinyl chloride; and polycarbonate (PC), polyamide (PA), polyurethane (PU), ethylene.vinyl alcohol copolymer (EVOH) and polyvinylidene chloride resin (PVDC). Preferable examples of thermoplastic resin films which scarcely impose burden on the environment include films formed from biodegradable polymers such as polylactic acid, polysuccinates and polycaprolactone.

In the composite gas barrier films according to the present invention, the thermoplastic resin film is used in the form of a single-layer film or multi-layer film. It is desirable from the viewpoints of processability, profitability, etc. that the thickness of the thermoplastic resin film should be within a range of generally from 1 μm to 2.5 mm, preferably from 5 μm to 2 mm, more preferably from 10 μm to 1 mm.

Adhesive Layer

In order to enhance interlayer adhesion between the thermoplastic resin film layer and the polyglycolic acid film layer, an adhesive layer may be provided between the individual layers in the present invention. Examples of an adhesive used for the adhesive layer include polymers such as carboxylated polyolefin, epoxidized polyolefin, ethylene-vinyl acetate copolymer, ionomer, polyurethane, epoxy resin, SBS, SEBS, polychloroprene, styrene. butadiene copolymer rubber (SBR) and natural rubber (NR).

The carboxylated polyolefin means a polyolefin modified with an unsaturated acid monomer such as acrylic acid, methacrylic acid or maleic anhydride to introduce a carboxyl group into the polyolefin. The introduction of the carboxyl group may be conducted by either a copolymerization process or a grafting process. The above unsaturated acid monomer may be used in combination with a vinyl monomer such as a methacrylic ester, acrylic ester or vinyl acetate.

The epoxidlzed polyolefin means a polyolefin modified with an epoxy group-containing monomer such as glycidyl methacrylate to introduce an epoxy group into the polyolefin. The introduction of the epoxy group may be conducted by either a copolymerization process or a grafting process. The above epoxy group-containing monomer may be used in combination with a vinyl monomer such as a methacrylic ester, acrylic ester or vinyl acetate.

Of these polymers, the carboxylated polyolefin and ethylene vinyl acetate copolymer are particularly preferred from the viewpoints of adhesion and processability. The thickness of the adhesive layer is within a range of generally from 0.5 μm to 2 mm, preferably from 2 μm to 1 mm, more preferably from 3 μm to 0.5 mm. If the thickness is smaller than 0.5 μm, there is a possibility that the adhesion may become insufficient, and it is also difficult to form such a thin coating film. If the thickness exceeds 2 mm, the production cost of the resulting composite film is increased, and so it is hence disadvantageous to provide the adhesive layer in such a great thickness from the viewpoint of profitability.

Polyalycolic Acid Film Layer

In the composite gas barrier films according to the present invention, a polyglycolic acid film is laminated as a gas barrier resin layer on a thermoplastic resin film for the purpose of improving the oxygen gas barrier property and/or carbon dioxide gas barrier property of the thermoplastic resin film. When a general thermoplastic resin film is used, both oxygen gas barrier property and carbon dioxide gas barrier property are improved.

The polyglycolic acid useful in the practice of the present invention is-a polymer containing a repeating unit represented by the following formula (1):

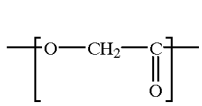

(1)

The proportion of the repeating unit represented by the formula (1) In the polymer is generally at least 60 wt. %, preferably at least 70 wt. %, more preferably 80 wt. %. If the proportion of the repeating unit represented by the formula (1) is lower than 60 wt. %, there is a possibility that the barrier properties of the resulting composite film may be impaired.

As examples of other repeating units than the repeating unit represented by the formula (1), may be mentioned a repeating unit represented by the following formula (2):

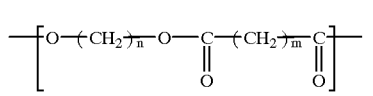
(2)

wherein n is 1–10, and m is 0–10, a repeating unit represented by the following formula (3):

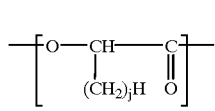
(3)

wherein j is 1–10, a repeating unit represented by the following formula (4):

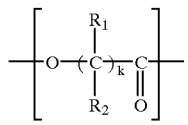
(4)

wherein $R_1$ and $R_2$ are independently a hydrogen atom or an alkyl group having 1 to 10 carbon atoms, and k is 2–10, a repeating unit represented by the following formula (5):

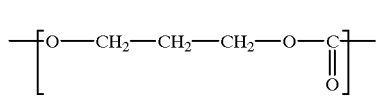
(5)

and a repeating unit represented by the following formula (6):

(6)

When these repeating units (2) to (6) are introduced in a proportion of at least 1 wt. %, the melting point, Tm of the resulting glycolic acid homopolymer can be lowered. If the Tm of the polyglycolic acid is lowered, the processing temperature of the polymer is lowered. Therefore, thermal decomposition upon melt processing can be reduced. Besides, the crystallization rate of the polyglycolic acid can be controlled by copolymerization to improve its extrudability and stretchability. If the proportion of these repeating units (2) to (6) exceeds 40 wt. % on the other hand, the gas barrier properties inherent in the polyglycolic acid are impaired, and there is also a possibility that the toughness and heat resistance of the resulting film may be deteriorated.

Molecular Weight—Melt Viscosity

The polyglycolic acid used in the composite gas barrier films according to the present invention is a high-molecular weight polymer. The melt viscosity of the polymer can be used as an index to its molecular weight. The polyglycolic acid used in the present invention has a melt viscosity, $\eta^*$ of generally 500 to 100,000 Pa·s, preferably 1,000 to 50,000 Pa·s, more preferably 1,500 to 20,000 Pa·s as measured at a temperature of (Tm+20° C.) (i.e., a temperature corresponding to a usual melt-processing temperature) and a shear rate of 100/sec.

If the melt viscosity, $\eta^*$ of the polyglycolic acid is lower than 500 Pa·s, there is a possibility that a melt of the polymer may undergo drawdown upon its melt-forming into a film, a film melt-extruded through a T-die may undergo deformation during its cooling, resulting in difficulty in melt processing, or the toughness of the resulting film may become insufficient. If the melt viscosity, $\eta^*$ of the polyglycolic acid exceeds 100,000 Pa·s, its melt processing requires a higher temperature, and there is hence a possibility that the polyglycolic acid may undergo heat deterioration upon the processing.

Thermal Properties

The melting point, Tm of the polyglycolic acid used in the present invention is generally at least 150° C., preferably at least 180° C., more preferably at least 200° C., often at least 210° C. The melt enthalpy, ΔHm of the polyglycolic acid used in the present invention is generally at least 20 J/g, preferably at least 30 J/g, more preferably 40 J/g. If the Tm or ΔHm of the polyglycolic acid is too low, there is a possibility that the gas barrier properties, heat resistance, mechanical strength and the like of the resulting film may become insufficient.

Preparation Process of Polyglycolic Acid

The polyglycolic acid used in the present invention can be prepared in accordance with, for example, the following ① ring-opening polymerization process or ② polycondensation process.

① The process comprises heating glycolide (i.e., 1,4-dioxane-2,5-dione) to a temperature of about 120° C. to about 250° C. in the presence of a small amount of a catalyst (for example, a cationic catalyst such as a tin organic carboxylate, tin halide or antimony halide) to subject the glycolide to ring-opening polymerization. The ring-opening polymerization is preferably conducted by a bulk polymerization process or solution polymerization process.

② The polycondensation process comprises heating glycolic acid or an alkyl glycolate in the presence or absence of a catalyst to subject the glycolic acid or alkyl glycolate to dehydration or dealcoholization.

In order to obtain a glycolic acid copolymer, it is only necessary to copolymerize glycolide, glycolic acid or an alkyl glycolate in accordance with the above process ① or ② in suitable combination with, as a comonomer, for example, a cyclic monomer such as ethylene oxalate (i.e., 1,4-dioxane-2,3-dione), lactide, a lactone (for example, β-propiolactone, β-butyrolactone, pivalolactone, γ-butyrolactone, δ-valerolactone, β-methyl-δ-valerolactone or ε-caprolactone), trimethylene carbonate or 1,3-dioxane; a hydroxycarboxylic acid such as lactic acid, 3-hydroxypropanoic acid, 3-hydroxybutanoic acid, 4-hydroxybutanoic acid or 6-hydroxycaproic acid, or an alkyl ester thereof; a substantially equimolar mixture of an aliphatic diol such as ethylene glycol or 1,4-butanediol and an aliphatic dicarboxylic acid such as succinic acid or adipic acid or an alkyl ester thereof; or two or more compounds thereof.

The glycolic acid copolymer may also be one obtained by subjecting the polyglycolic acid and, for example, another polymer having repeating units selected from the formulae (2) to (5) to transesterification under heating.

Of the above preparation processes, the ring-opening polymerization process ① is preferred because a higher-molecular weight polyglycolic acid is obtained.

As the glycolide (dimeric cyclic ester of glycolic acid) used as a monomer in the preparation process ①, glycolide obtained by "solution-phase depolymerization process" (Japanese Patent Application No. 38404/1997) developed by the present inventors is preferred to one obtained by the conventional sublimation depolymerization process of a glycolic acid oligomer because a high-purity product can be mass-produced at a higher yield. The use of high-purity glycolide as a monomer permits the easy provision of high-molecular weight polyglycolic acid.

According to the solution-phase depolymerization process, (1) a mixture containing a glycolic acid oligomer and at least one high-boiling point polar organic solvent having a boiling point within a range of from 230 to 450° C. is heated to a temperature, at which the depolymerization of the oligomer takes place, under ordinary pressure or under reduced pressure, (2) the oligomer is dissolved in the solvent until a residual rate (volume ratio) of a melt phase of the oligomer reaches 0.5 or lower, (3) the heating is further continued at the same temperature to depolymerize the oligomer, (4) a dimeric cyclic ester (i.e., glycolide) formed is distilled out together with the high-boiling point polar organic solvent, and (5) the glycolide is recovered from the distillate.

Examples of the high-boiling point polar organic solvent include aromatic carboxylic acid esters, such as bis (alkoxyalkyl) phthalates such as di(2-methoxyethyl) phthalate, alkylene glycol dibenzoates such as diethylene glycol dibenzoate, benzylbutyl phthalate, and dibutyl phthalate; and aromatic phosphoric acid esters such as tricresyl phosphate. The high-boiling point polar organic solvent is used in a proportion of generally 0.3 to 50 times (weight ratio) to the glycolic acid oligomer. Polypropylene glycol, polyethylene glycol, tetraethylene glycol or the like may be used as a solubilizing agent for the glycolic acid oligomer in combination with the high-boiling point polar organic solvent as needed. The depolymerization of the glycolic acid oligomer is generally conducted at 230° C. or higher, preferably 230 to 320° C. Although the depolymerization is conducted under atmospheric pressure or reduced pressure, it is preferable to heat the oligomer under reduced pressure of 0.1 to 90.0 kPa (1 to 900 mbar) to depolymerize it.

In the production of the polyglycolic acid used in the present Invention, a neat resin of the polyglycolic acid may be used by itself. However, a resin composition obtained by incorporating inorganic fillers, other thermoplastic resins, plasticizers and the like into the polyglycolic acid within limits not impeding the objects of the present invention may also be used. More specifically, there may be used a composition (compound) obtained by incorporating the inorganic fillers, other thermoplastic resins and plasticizers in proportions of generally 0 to 30 parts by weight, 0 to 30 parts by weight and 0 to 50 parts by weight, respectively, per 100 parts by weight of the polyglycolic acid. If the inorganic fillers or other thermoplastic resins are used in a proportion exceeding 30 parts by weight, or the plasticizers are used in a proportion exceeding 50 parts by weight, there is a possibility that the barrier properties of the resulting polyglycolic acid film may become insufficient, or the melt processability of the composition may be deteriorated.

Examples of the inorganic fillers include powders, whiskers and fibers of alumina, silica, silica-alumina, zirconia, titanium oxide, iron oxide, boron oxide, calcium carbonate, calcium silicate, calcium phosphate, calcium sulfate, magnesium carbonate, magnesium silicate, magnesium phosphate, magnesium sulfate, kaolin, talc, mica, ferrite, carbon, silicon, silicon nitride, molybdenum disulfide, glass, potassium titanate and the like. These inorganic fillers may be used either singly or in any combination thereof.

Examples of the other thermoplastic resins include a homopolymer and copolymers of lactic acid, a homopolymer and copolymers of ethylene oxalate, a homopolymer and copolymers of ε-caprolactone, polysuccinates, polyhydroxybutanoic acid, hydroxybutanoic acid-hydroxyvaleric acid copolymers, cellulose acetate, polyvinyl alcohol, starch, polyglutamates, natural rubber, polyethylene, polypropylene, styrene-butadiene copolymer rubber, acrylonitrile-butadiene copolymer rubber, polymethyl methacrylate, polystyrene, styrene-butadiene-styrene block copolymers, styrene-ethylene-butylene-styrene block copolymers, ABS resins, MBS resins and ethylene-vinyl alcohol copolymers. These thermoplastic resins may be used either singly or in any combination thereof.

Examples of the plasticizers include phthalates such as di(methoxyethyl) phthalate, dioctyl phthalate, diethyl phthalate and benzylbutyl phthalate; benzoates such as diethylene glycol dibenzoate and ethylene glycol dibenzoate; aliphatic dibasic acid esters such as octyl adipate and octyl sebacate; aliphatic tribasic acid esters such as tributyl acetylcitrate; phosphates such as dioctyl phosphate and tricresyl phosphate; epoxy plasticizers such as epoxidized soybean oil; and polyalkylene glycol esters such as polyethylene glycol sebacate and polypropylene glycol laurate. These plasticizers may be used either singly or in any combination thereof.

In the present invention, various additives such as heat stabilizers, light stabilizers, moistureproofing agents, waterproofing agents, water repellents, lubricants, parting agents, coupling agents, pigments and dyes may be added to the polyglycolic acid as needed. These various additives are used in an effective amount as necessary for the end application intended.

Unoriented Film

When the composite gas barrier film according to the present invention is produced by the laminating method or extrusion coating method, an unoriented film of the polyglycolic acid may be used. The unoriented polyglycolic acid film can be produced by melt-extruding the neat resin of the polyglycolic acid or the composition comprising the polyglycolic acid in the form of a film, cooling the film-like extrudate and optionally heat setting it.

Oriented Film

When the composite gas barrier film according to the present invention is produced by the laminating method or extrusion coating method, an oriented film of the polyglycolic acid may be used. The oriented polyglycolic acid film can be produced by melt-extruding the neat resin of the polyglycolic acid or the composition comprising the polyglycolic acid, stretching or orienting the extrudate and optionally heat setting the stretched film. As the melting and film-forming process, there may be used processes such as uniaxial stretching, sequential biaxial stretching and simultaneous biaxial stretching by a flat-die method, and blown-film biaxial stretching by a circular-die method. Examples of preferred processes include the following processes:

① Roll process: a process in which a film melt-extruded through a T-die is stretched in a machine direction ① (MD) through stretching rolls to produce a uniaxially oriented flat film.

② Tenter process: a process in which a film melt-extruded through a T-die is oriented in an MD through stretching rolls and then oriented in a transverse direction (TD) by means of a tenter to produce a biaxially oriented flat film.

③ Blown-film extrusion process: a process in which the neat resin or resin composition is melt-extruded by means of a ring die for brown-film extrusion in the form of a tube, the tube is cooled down to the melting point of the polymer or lower and quenched down to, preferably, a crystallization temperature ($Tc_1$) of the polymer or lower, and a gas is then introduced under pressure into the tube to inflate and stretch the tube. When the tube is also stretched in a machine direction between nip rolls, a biaxially oriented film is obtained. Methods for cooling the tube after the melt extrusion include an airing method, a method in which the tube is immersed in cold water, and the like.

Polyglycolic acid films obtained by conducting only the stretching or orientation without performing the heat setting in the individual production processes of the composite gas barrier films according to the present invention can be used for heat-shrinkable composite films having a high heat shrinkage.

The thickness of the polyglycolic acid film, which is a gas barrier property improver for the composite gas barrier films according to the present invention, is within a range of generally from 1 μm to 2 mm, preferably from 2 μm to 1.5 mm, more preferably from 5 μm to 1 mm. If the thickness is smaller than 1 μm, there is a possibility that the effect of this film on the improvement of gas barrier properties may become insufficient. If the thickness exceeds 2 mm on the other hand, the resulting composite film becomes overquality and hence has economical disadvantage.

Physical Properties of Composite Gas Barrier Film

The composite gas barrier film according to the present invention is a composite film the oxygen gas transmission rate and/or the carbon dioxide gas transmission rate of which have been improved or reduced to at most a half, preferably at most a fifth, more preferably at most a tenth compared with the respective values of the thermoplastic resin film (base film).

More specifically, at least one of the oxygen gas transmission rate and carbon dioxide gas transmission rate of the composite film obtained by combining the polyglycolic acid film as a barrier property improver with a film formed of a thermoplastic resin such as polyolefin, polyester, polystyrene, polyvinyl chloride, polycarbonate, polylactic acid, polysuccinate, polycaprolactone, polyamide, EVOH or PVDC is surprisingly improved compared with that of the thermoplastic resin film itself.

In addition, the composite gas barrier films according to the present invention have a great feature that their gas barrier properties are scarcely lowered even when they are treated under high-temperature and high-humidity conditions.

Production Process of Composite Gas Barrier Film

The process for producing the composite gas barrier films according to the present invention is roughly divided into the following methods:

① Fusion-bonding method;
② Laminating method (dry lamination, hot-melt lamination, wet lamination, non-solvent lamination, etc.);
③ Extrusion coating method; and
④ Co-extrusion method (blown-film extrusion process, T-die extrusion process, etc.).

Fusion-bonding Method

The respective surfaces of the thermoplastic resin film and the polyglycolic acid film are brought into contact with each other, and the thermoplastic resin film (in the case of a multi-layer film, its contact surface layer) in contact with the polyglycolic acid film is press-bonded to the polyglycolic acid film at a temperature not lower than about the melting point, Tm of the thermoplastic resin using heated rolls, a hot press or the like, whereby a composite film can be obtained.

At this time, it is desirable that the surface of the polyglycolic acid film should be subjected in advance to a mechanical surface-roughening treatment, activating treatment by a corona discharge treatment, activating treatment by a chemical. In the fusion-bonding method, there is a possibility that the adhesion of the polyglycolic acid film to a thermoplastic resin film having low polarity, such as a polyolefin film may become insufficient.

Laminating Method

As the laminating method, are preferred the following processes:

(1) Dry laminating process:

The surface of the thermoplastic resin film or the surface of the polyglycolic acid film is coated with an adhesive of the solution, latex or dispersion type, and the solvent in the adhesive is volatilized off to dry the adhesive. Thereafter, the other film is laid on the coated surface of said one film to press-bond both films to each other while heating them by hot rolls or hot press, whereby a composite film can be produced.

(2) Hot-melt laminating process:

The process comprises applying a hot-melt adhesive (for example, EVA adhesive) in the form of powder or a film to the surface of the thermoplastic resin film or the polyglycolic acid film, and laying the other film on the coated surface of said one film to hot-press both films, thereby bonding them to each other.

The composite film may also be obtained by a process comprising heating and melting the hot-melt adhesive to apply the melt to the surface of one film, and then laying the other film on the coated surface of said one film to press both films, thereby bonding them to each other, or a process comprising inserting a film of the adhesive between the thermoplastic resin film and the polyglycolic acid film and hot-pressing both films to bond them to each other.

Extrusion Coating Method

A resin forming the thermoplastic resin film is fed to an extruder equipped with a T-die, and the resin is melted and extruded through the T-die to uniformly apply the melt to the surface of the polyglycolic acid film or a multi-layer film containing the polyglycolic acid film, whereby a composite film can be obtained. In this case, an adhesive layer may be applied in advance to the surface of the polyglycolic acid film.

Co-extrusion Method

The co-extrusion method is a process comprising feeding a resin to be formed into the thermoplastic resin film, such as polyolefin, polyester, polystyrene or polyvinyl chloride, polyglycolic acid as a barrier property improver and an optional resin to be used as an adhesive between both films from respective extruders to a die and extruding them at the same time to bond the extruded films to each other, thereby producing a composite film at one stage. The co-extrusion method may be generally divided into a T-die extrusion process and a blown-film extrusion process.

① In the T-die extrusion process, typical methods include a laminar flow system using a single-manifold die, an in-die laminating system using a multi-manifold die and an out-of-die laminating system using a dual-slot die.

A resin to be formed into the thermoplastic resin film, polyglycolic acid and an optional resin to be used as an adhesive are fed from respective extruders to the die to co-extrude them, and the extrudate is taken up on a casting roll, stretched in an MD by stretching rolls or the like, optionally stretched in a TD by a tenter or the like to form a film. Further, the film is optionally heat set, whereby a composite film can be produced. When a thin composite film having a thickness of 30 μm or smaller is produced, the T-die extrusion process is preferred.

② In the blown-film extrusion process, typical methods include an in-die laminating method (Robert•Colombo method, etc.) and an out-of-die laminating method. A resin to be formed into the thermoplastic resin film, polyglycolic acid and an optional resin to be used as an adhesive are fed from respective extruders to a die to co-extrude them, and the extrudate is inflated into a tubular film. The tubular film is then folded by pressing it as needed, thereby obtaining a flat film. Further, the flat film can be optionally heat set to produce a composite film.

Application Fields

The composite gas barrier films according to the present invention can be used in, for example, food packaging materials (packaging materials for meat, fishes and shellfishes, dairy products, pickles, miso, confectionery, tea•coffee, noodles, rice, etc.), toiletry packaging materials, drug packaging materials, etc. making good use of their excellent oxygen gas barrier property and/or carbon dioxide gas barrier property. In particular, they are preferably used as packaging materials for food and goods which require a treatment under high-temperature and high-humidity conditions, such as retorting, food and goods which particularly require a long-term storage, food and goods which require to lighten burden on the environment, etc.

EXAMPLES

The present invention will hereinafter be described more specifically by the following Synthesis Example, Examples and Comparative Examples.

Measuring Methods of Physical Properties
(1) Melt viscosity, $\eta^*$:
As an index to the molecular weight of each polymer, its melt viscosities, $\eta^*$ was measured. A crystallized sheet obtained by heating an amorphous sheet about 0.2 mm thick of the polymer at about 150° C. for 5 minutes was used as a sample, and the melt viscosity of the sample was measured at a temperature of (Tm+20° C.) and a shear rate of 100/sec by means of a "Capirograph" (manufactured by Toyo Seiki Seisakusho, Ltd.) equipped with a nozzle having a diameter (D) of 0.5 mm and a length (L) of 5 mm.
(2) Thermal properties of polymer:
An amorphous sheet about 0.2 mm thick of each polymer was used as a sample and heated by means of a differential scanning calorimeter (DSC; TC-10A Model, manufactured by Mettler Instrument AG) at a rate of 10°C./min under a nitrogen gas stream, thereby measuring the crystallization temperature ($Tc_1$), melting point (Tm) and melt enthalpy (ΔHm) of the sample. The glass transition temperature (Tg) was measured at a heating rate of 5° C./min.
(3) Thickness of film:
The thicknesses of 10 points of each film sample were measured by means of a micrometer (μ-mate, manufactured by SONY CORP.) to determine an average value thereof.
(4) Oxygen gas transmission rate ($O_2$ transmission rate):
The oxygen gas transmission of each film sample was measured at 23° C. and 80% RH in accordance with JIS K-7126 by means of a double-side moistening gas transmission tester manufactured by GL Sciences Inc. to determine its oxygen gas transmission rate in terms of a value in a film thickness of 1 mm.
(5) Carbon dioxide gas transmission rate ($CO_2$ transmission rate):
The carbon dioxide gas transmission of each film sample was measured at 23° C. and 80% RH in accordance with JIS K-7126 by means of a double-side moistening gas transmission tester manufactured by GL Sciences Inc. to determine its carbon dioxide gas transmission rate in terms of a value in a film thickness of 1 mm.

Synthesis Example 1 Synthesis of Monomer

A 10-liter autoclave was charged with 5 kg of glycolic acid (product of Wako Pure Chemical Industries, Ltd.). While stirring, the temperature of the contents was raised from 170° C. to 200° C. over about 2 hours to heat them, whereby glycolic acid was condensed while distilling off water formed. The pressures inside the autoclave was then reduced to 20 kPa (200 mbar), and the reaction mixture was held for 2 hours under such a pressure, thereby distilling off low-boiling matter to prepare a glycolic acid oligomer. The melting point, Tm of the thus-obtained oligomer was 205° C.

A 10-liter flask was charged with 1.2 kg of the glycolic acid oligomer, and 5 kg of benzylbutyl phthalate (product of Junsei Chemical Co., Ltd.) as a solvent and 150 g of polypropylene glycol (#400, product of Junsei Chemical Co., Ltd.) as a solubilizing agent were added thereto. The mixture was heated to about 270° C. under reduced pressure of 5 kPa (50 mbar) in a nitrogen gas atmosphere to conduct "solution-phase depolymerization" of the oligomer. Glycolide formed was distilled out together with benzylbutyl phthalate.

Cyclohexane about twice by volume as much as the distillate was added to the distillate collected, and glycolide was crystallized from benzylbutyl phthalate and collected by filtration. The glycolide thus obtained was recrystallized from ethyl acetate and dried under reduced pressure to obtain purified glycolide.

Polymer Preparation Example 1

A PFA-made cylinder was charged with 200 g of glycolide obtained in Synthesis Example 1, and the glycolide was dried at room temperature for about 30 minutes while introducing nitrogen gas therein. As a catalyst, 0.04 g of $SnCl_4 \cdot 6.5H_2O$ were added, and the contents were held at 170 to 175° C. for 2 hours while introducing nitrogen gas therein, thereby polymerizing glycolide. After completion of the polymerization, the cylinder was cooled down to room temperature, and a bulk polymer taken out of the cylinder was ground into fine particles having a particle size of about 3 mm or smaller. The fine particles were dried overnight at about 150° C. under reduced pressure of about 0.1 kPa to remove a remaining monomer, thereby obtaining polyglycolic acid [Polymer (P-1)]. The same process was conducted repeatedly to prepare a necessary amount of Polymer (P-1).

Polymer Preparation Example 2

Polymerization and post-treatment were performed in the same manner as in Polymer Preparation Example 1 except that a mixture of 196 g of glycolide and 4 g of L-(−)-lactide was used in place of 200 g of glycolide, thereby obtaining a glycolic acid-lactide copolymer [Polymer (P-2)]. The same process was conducted repeatedly to prepare a necessary amount of Polymer (P-2).

The compositions and physical properties of the polyglycolic acids obtained in Polymer Preparation Examples 1 and 2 are shown in Table 1.

TABLE 1

|  |  | Polymer Preparation Example | |
|---|---|---|---|
|  |  | 1 | 2 |
| Composition of Monomer (wt/wt) |  | GA | GA/LA = 98/2 |
| Polymer code |  | P-1 | P-2 |
| $\eta^*$ (Pa · s) |  | 4,000 | 3,800 |
| Thermal properties | Tg (° C.) | 38 | 38 |
|  | $Tc_1$ (° C.) | 84 | 77 |
|  | Tm (° C.) | 221 | 216 |
|  | ΔHm (J/g) | 72 | 68 |

(Note) GA = Glycolide; LA = L-(−)Lactide.

Pellet Preparation Example 1

A small twin-screw extruder equipped with a nozzle having a diameter of 3,mm was charged with Polymer (P-1) under a nitrogen gas stream. The polymer was extruded in the form of a strand at a melt temperature of about 230° C. to 235° C. The thus-obtained strand was air-cooled and chopped to obtain Pellet (No. 1).

Pellet Preparation Example 2

Pellet (No. 2) was prepared in the same manner as in Pellet Preparation Example 1 except that Polymer (P-2) was used, and the melt temperature was changed to about 225 to 230° C.

Formation Example 1 of Polyglycolic Acid Film

A portion of Pellet (No. 1) obtained in Pellet preparation Example 1 was fed to a small twin-screw extruder equipped with a ring die for blown-film extrusion under a nitrogen gas stream and extruded in the form of a tube at a resin temperature of about 230° C. through the ring die. The tube was quenched in a cooling bath and heated again to inflate the tube at 42 to 43° C. and a blow-up ratio of about 3 times. A take-up rate was controlled in such a manner that the draw ratio in the machine direction of the tube amounted to about 3 times, whereby the tube was taken up through nip rolls to prepare a tubular film. A part of this film was cut out and fixed to a metal frame to heat set it at 150° C. for 1 minute to obtain Biaxially Oriented Film (F1-1).

Formation Example 2 of Polyglycolic Acid Film

Biaxially Oriented Film (F2-1) was obtained in the same manner as in Formation Example 1 of Polyglycolic Acid Film except that a part of Pellet (No. 2) was used, and the resin temperature was changed to about 225° C.

Formation Example 3 of Polyglycolic Acid Film

A portion of Pellet (No. 1) obtained in Pellet Preparation Example 1 was fed to an extruder equipped with a coathanger type T-die to extrude it at a resin temperature of about 230° C. in the form of a sheet. The sheet was quenched down to below Tg on the surface of a cooling roll and then caused to pass through a tunnel oven controlled at 150° C. to heat set it under tension for about 1 minute. The thus-obtained film was then cut in desired lengths to obtain Unoriented Film (F1-2).

Example 1

Carboxylated polyolefin [MODIC E-300S, trademark, product of Mitsubishi Petrochemical Company, Limited] was held between two polytetrafluoroethylene sheets and hot-pressed at about 200° C. by a hot press, thereby preparing a carboxylated polyolefin film (adhesive film) having a thickness of about 75 $\mu$m.

The oriented polyglycolic acid film (F1-1) was held between two sheets of the above adhesive film. The thus-obtained laminate was held between two LDPE (low density polyethylene) films, one sides of which had been subjected to a corona discharge treatment, and they were heated and press-bonded to one another at about 150° C. to prepare Composite Film (ML-1) having a 5-layer structure of "LDPE/adhesive/polyglycolic acid/adhesive/LDPE". The oxygen gas transmission rate and carbon dioxide gas transmission rate of this composite film (ML-1) were measured.

Example 2

Composite Film (ML-2) having a 5-layer structure was prepared in the same manner as in Example 1 except that (F2-1) was used as the polyglycolic acid film in place of (F1-1). The respective gas transmission rates of the thus-obtained composite film were determined.

Example 3

Composite Film (ML-3) having a 5-layer structure was prepared in the same manner as in Example 1 except that Unoriented Film (F1-2) was used as the polyglycolic acid film in place of (F1-1). The respective gas transmission rates of the thus-obtained composite film were determined.

Example 4

Composite film (ML-4) having a 5-layer structure of "CPP/adhesive/polyglycolic acidladhesive/CPP" was prepared in the same manner as in Example 1 except that CPP (cast Polypropyrene) films, one sides of which had been subjected to a corona discharge treatment, were used in place of the LDPE films. The respective gas transmission rates of the thus-obtained composite film were determined.

Example 5

A commercially available EVA adhesive sol [Chemipearl V100, trademark, product of Mitsui-Toatsu Chemicals, Inc.] was applied to the surface of Polyglycolic Film (F1-1), and the solvent in the adhesive was volatilized off to dry the adhesive. A LDPE film, one side of which had been subjected to a corona discharge treatment, was then laid on the coated surface thereof, and both films were heated and press-bonded to each other at about 100° C. using a hot press, thereby preparing Composite Film (ML-5) having a 3-layer structure of "LDPE/adhesive/polyglycolic acid". The respective gas transmission rates of the thus obtained composite film were determined.

Example 6

After a commercially available adhesive film [release paper-attached Nitto Hot-Bonding Film (hot-melt type); product of Nitto Electric Industry Co., Ltd.] was laid on Polyglycolic Film (F1-1), and both films were heated and press-bonded to each other at about 120° C. The release paper was then separated to prepare a film having a 2-layer structure of "adhesive/polyglycolic acid". LDPE (MI=10) was then fed to a small extruder equipped with a coathanger type T-die to extrude it at a resin temperature of about 200° C., thereby uniformly applying the resin in a state of a molten film to the adhesive layer surface of the two-layer film to prepare Composite Film (ML-6) having a 3-layer structure of "LDPE/adhesive/polyglycolic acid". The respective gas transmission rates of the thus-obtained composite film were determined.

Example 7

Pellet (No. 1) obtained in Pellet Preparation Example 1, a commercially available LDPE (MI=10 g/10 min) and carboxylated polyolefin (MODIC E-300S, trademark) as an adhesive were fed to a 3-layer multi-manifold die at a resin temperature of about 230° C. from respective extruders and extruded through the die in the form of a film. The extrudate was quenched down to below Tg on the surface of a cooling dram (surface temperature: 3 to 5° C.) equipped with a pinning device capable of applying a static potential of 5 kV. The quenched film was caused to pass through stretching rolls via guide rolls, thereby stretching it about 3 times in an MD at about 42 to 43° C. After the stretched film was then stretched about 3 times in a TD at the same temperature by means of a tenter and further heat-treated at about 150° C. for about 15 seconds while maintaining its length constant, it was wound up, thereby preparing Composite Film (ML-7) having a 3-layer structure of "LDPE/adhesive/polyglycolic acid" by the co-extrusion method. The respective gas transmission rates of the thus-obtained composite film were determined.

Example 8

Commercially available polylactic acid pellets [Lacty, trademark, product of Shimadzu Corporation] were pressed at about 200° C. using a hot press to prepare a polylactic acid film. On the other hand, commercially available polysuccinate pellets [Bionole #1000, trademark, product of Showa Highpolymer Co., Ltd.] were pressed likewise at about 150° C. to prepare a polysuccinate film.

The same EVA adhesive sol as that used in Example was applied to one side of Polyglycolic Acid Film (F1-1), and the solvent in the adhesive was volatilized off to dry the adhesive. Thereafter, the above polylactic acid film was laid on the adhesive layer, and both films were heated and press-bonded to each other at about $_{80}$° C. The adhesive was then applied likewise to the other side of the polyglycolic acid film, and the solvent in the adhesive was volatilized off to dry the adhesive. Thereafter, the above polysuccinate film was press-bonded under heating to the thus-dried adhesive layer, thereby preparing Composite Film (ML-8) having a 5-layer structure of "polylactic acid/adhesive/polyglycolic acid/adhesive/polysuccinate". The respective gas transmission rates of the thus-obtained composite film were determined.

The gas transmission rates of the composite gas barrier films (ML-1 to ML-8) according to the present invention, which were obtained in Examples 1 to 8 and contained the respective polyglycolic acid film layers, are shown collectively in Table 2. Respective ratios of these gas transmission rates to the gas transmission rates of their corresponding base films are also shown collectively in Table 2. However, the gas transmission rates of each base film used in the comparison are values converted from values measured in a thickness of 100 μm for PE, 50 μm for PP, 30 μm for polylactic acid (LA) or 30 μm for polysuccinate.

TABLE 2

| | | Example | | | | | | | |
|---|---|---|---|---|---|---|---|---|---|
| | | 1 | 2 | 3 | 4 | 5 | 6 | 7 | 8 |
| Composite Film | Code No. | ML-1 | ML-2 | ML-3 | ML-4 | ML-5 | ML-6 | ML-7 | ML-8 |
| | Structure | PE/Adh/ PGA/Adh/ PE | PE/Adh/ PGA/Adh/ PE | PE/Adh/ PGA/Adh/ PE | PP/Adh/ PGA/Adh/ PP | PE/Adh/ PGA | PE/Adh/ PGA | PE/Adh/ PGA | LA/Adh/ PGA/Adh/ BS |
| | Thickness (μm) | 100/75/ 20/75/ 100 | 100/75/ 16/75/ 100 | 100/75/ 100/75/ 100 | 50/75 20/75/ 50 | 100/5/20 | 30/100/ 20 | 30/10/20 | 30/5/20/ 5/30 |
| PGA Code No. | | F1-1 | F2-1 | F1-2 | F1-1 | F1-1 | F1-1 | — | F1-1 |
| $O_2$ transmission rate; 23° C., 80% RH ($cm^3 \cdot mm/m^2 \cdot day \cdot atm$) | | 0.26 | 0.30 | 0.04 | 0.20 | 0.10 | 0.10 | 0.04 | 0.06 |
| $CO_2$ transmission rate; 23° C., 80% RH ($cm^3 \cdot mm/m^2 \cdot day \cdot atm$) | | 1.10 | 1.30 | 0.19 | 0.80 | 0.35 | 0.41 | 0.16 | 0.25 |
| Composite film/base film | | ML-1/PE | ML-2/PE | ML-3/PE | ML-4/PE | ML-5/PE | ML-6/PE | ML-7/PE | ML-8/ (LA/BS) |
| Transmission rate of composite film/ transmission rate of base film | $O_2$ | 3/1000 | 3/1000 | <1/1000 | 9/1000 | <1/1000 | <1/1000 | <1/1000 | 3/1000 |
| | $CO_2$ | 2/1000 | 3/1000 | <1/1000 | 8/1000 | <1/1000 | <1/1000 | <1/1000 | 1/1000 |

(Note) PE=Polyethylene, PGA=Polyglycolic acid, PP=Polypropylene, LA=Polylactic acid, BS=Polysuccinate.

Comparative Example 1

Composite Film (ML-C1) having a layer structure of "LDPE/adhesive/adhesive/LDPE" was prepared in the same manner as in Example 1 except that Polyglycolic Acid Film (F1-1) in Example 1 was omitted. The respective gas transmission rates of the thus-obtained composite film were determined.

Comparative Example 2

Composite Film (ML-C4) having a layer structure of "CPP/adhesive/adhesive/CPP" was prepared in the same manner as in Example 4 except that Polyglycolic Acid Film (F1-1) in Example 4 was omitted. The respective gas transmission rates of the thus-obtained composite film were determined.

Comparative Example 3

Composite Film (ML-C5) having a 3-layer structure of "LDPE/adhesive/LDPE" was prepared in the same manner as in Example 5 except that Polyglycolic Acid Film (F1-1) in Example 5 was omitted, and the LDPE film layer was divided into halves in thickness to press-bond these two film portions to both surfaces of the adhesive layer because the exposure of the adhesive surface had the possibility of its adhering. The respective gas transmission rates of the thus-obtained composite film were determined.

Comparative Example 4

The same EVA adhesive film as that used in Example 6 was laid on a commercially available LDPE film, one side of which had been subjected to a corona discharge treatment, and both films were heated and press-bonded to each other at about 100° C. The release paper was separated to prepare Composite Film (ML-C6) having a 2-layer structure of "adhesive/PE". The respective gas transmission rates of the thus-obtained composite film were determined.

Comparative Example 5

Composite Film (ML-C7) was prepared by using LDPE in place of the polyglycolic acid used in Example 7 and changing the extrusion rate. The respective gas transmission rates of the thus-obtained composite film were determined.

Comparative Example 6

The use of Polyglycolic Acid Film (F1-1) used in Example 8 was omitted. The same EVA adhesive sol as that used in Example was applied to the same polylactic acid film as that used in Example 8, and the solvent in the adhesive was volatilized off to dry the adhesive. Thereafter, a polysuccinate (BS) film was press-bonded under heating to the thus-dried adhesive layer, thereby preparing Composite Film (ML-C8) having a layer structure of "polylactic acid/adhesive/polysuccinate". The respective gas transmission rates of the thus-obtained composite film were determined.

The layer structures and respective gas transmission rates of the composite films obtained in Comparative Examples 1 to 6 are shown collectively in Table 3.

TABLE 3

| | | Comparative Example | | | | | |
|---|---|---|---|---|---|---|---|
| | | 1 | 2 | 3 | 4 | 5 | 6 |
| Composite Film | Code No. | ML-C1 | ML-C4 | ML-C5 | ML-C6 | ML-C7 | ML-C8 |
| | Structure | PE/Adh/PE | PP/Adh/PP | PE/Adh/PE | PE/Adh | PE/Adh/PE | LA/Adh/BS |
| | Thickness (μm) | 100/150/100 | 50/150/50 | 50/5/50 | 30/100 | 30/10/20 | 30/10/30 |
| $O_2$ transmission rate; 23° C., 80% RH ($cm^3 \cdot mm/m^2 \cdot day \cdot atm$) | | 100 | 60 | 95 | 80 | 90 | 30 |
| $CO_2$ transmission rate; 23° C., 80% RH ($cm^3 \cdot mm/m^2 \cdot day \cdot atm$) | | 500 | 300 | 480 | 410 | 450 | 220 |

(Note)
PE = Polyethylene, PGA = Polyglycolic acid, PP = Polypropylene, LA = Polylactic acid, BS = Polysuccinate.

INDUSTRIAL APPLICABILITY

According to the present invention, there are provided composite gas barrier films suitable for use in packaging materials for food and goods which require a treatment under high-temperature and high-humidity conditions, such as retorting, food and goods which particularly require a long-term storage, etc. According to the present invention, there are also provided composite films far excellent in oxygen gas barrier property and carbon dioxide gas barrier property. According to the present invention, there are further provided composite gas barrier films which scarcely imposes burden on the environment by combining biodegradable films with each other.

What is claimed is:

1. A composite gas barrier film having a layer structure comprising a thermoplastic resin film laminated on at least one side of a film formed from polyglycolic acid containing at least 60 wt. % of a repeating unit represented by the following formula (1):

wherein the polyglycolic acid film is a film formed from polyglycolic acid having a melt viscosity, η* 500 to 100,000 Pa•s as measured at a temperature of the melting point of the polymer +20° C. and a shear rate of 100/sec, a melting point, Tm, of at least 150° C., and a melt enthalpy, ΔHm, of at least 20 J/g, and wherein an adhesive layer is provided between the polyglycolic acid film and the thermoplastic resin film.

2. The composite gas barrier film according to claim 1, wherein the thermoplastic resin film is a film formed from a thermoplastic resin selected from the group consisting of polyolefin, polyester, polystyrene, polyvinyl chloride, polycarbonate, polyamide, polyurethane, ethylene.vinyl alcohol copolymer, polyvinylidene chloride, polylactic acid, polysuccinate and polycaprolactone.

3. The composite gas barrier film according to claim 1, wherein at least one of the oxygen gas transmission rate and carbon dioxide gas transmission rate of the composite film as measured at 23° C. and 80% relative humidity is at most a half of that of the thermoplastic resin film to be combined.

4. The composite gas barrier film according to claim 1, wherein the thermoplastic resin film is bonded to at least one side of the polyglycolic acid film by a laminating method.

5. The composite gas barrier film according to claim 1, wherein the thermoplastic resin film is melt-extruded in the form of a film on at least one side of the polyglycolic acid film by an extrusion coating method.

6. The composite gas barrier film according to claim 1, wherein the polyglycolic acid and the thermoplastic resin are respectively melt-extruded by a co-extrusion method to bond the thermoplastic resin film in a molten state to at least one side of the polyglycolic acid film.

7. The composite gas barrier film according to claim 1, wherein the adhesive layer is a layer formed from an adhesive selected from the group consisting of carboxylated polyolefin, epoxidized polyolefin, ethylene-vinyl acetate copolymer, ionomer, polyurethane, epoxy resin, styrene.butadiene.styrene block copolymer, hydrogenated styrene.butadiene.styrene block copolymer, polychloroprene, styrene.butadiene copolymer rubber and natural rubber.

8. The composite gas barrier film according to claim 1, wherein the polyglycolic acid is a polymer obtained by ring-opening polymerization of glycolide.

9. The composite gas barrier film according to claim 1, which has a layer structure of thermoplastic resin/adhesive/polyglycolic acid.

10. The composite gas barrier film according to claim 9, which has a layer structure of polyolefin/adhesive/polyglycolic acid.

11. The composite gas barrier film according to claim 1, which has a layer structure of thermoplastic resin/adhesive/polyglycolic acid/adhesive/thermoplastic resin.

12. The composite gas barrier film according to claim 11, which has a layer structure of polyolefin/adhesive/polyglycolic acid/adhesive/polyolefin.

13. The composite gas barrier film according to claim 1, wherein the polyglycolic acid film is an unoriented film.

14. The composite gas barrier film according to claim 1, wherein the polyglycolic acid film is an oriented film.

15. A composite gas barrier film having a layer structure comprising a thermoplastic resin film laminated on at least one side of a film formed from polyglycolic acid containing at least 60 wt. % of a repeating unit represented by the following formula (1):

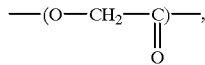
(1)

wherein the polyglycolic acid film is a film formed from polyglycolic acid having a melt viscosity, $\eta^*$ of 500 to 100,000 Pa·s as measured at a temperature of the melting point of the polymer +20° C. and a shear rate of 100/sec, a melting point, Tm, of at least 150° C., and a melt enthalpy, $\Delta$Hm, of at least 20 J/g, and wherein the thermoplastic resin film is formed from a thermoplastic resin selected from the group consisting of polyolefin, polystyrene, polyvinylchloride, polycarbonate, polyamide, polyurethane, ethylene-vinyl alcohol copolymer, polyvinylidine chloride, polylactic acid, polysuccinate and polycaprolactone.

16. A composite gas barrier film having a layer structure comprising a thermoplastic resin film laminated on at least one side of a film formed from polyglycolic acid containing at least 60 wt. % but less than 100 wt. % of a repeating unit represented by the following formula (1):

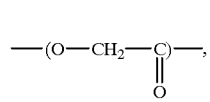
(1)

and higher than 0 wt. % but not higher than 40 wt. % of at least one comonomer selected from the group consisting of ethylene oxalate, lactones, trimethylene carbonate and 1,3-dioxane, wherein the polyglycolic acid from which the polyglycolic acid film is formed has a melt viscosity, $\eta^*$ of 500 to 100,000 Pa·s as measured at a temperature of the melting point of the polymer +20° C. and a shear rate of 10/sec, a melting point, Tm, of at least 150° C., and a melt enthalpy, $\Delta$Hm, of at least 20 J/g.

17. A composite gas barrier film having a layer structure comprising a thermoplastic resin film laminated on at least one side of a film formed from polyglycolic acid containing at least 60 wt. % of a repeating unit represented by the following formula (1):

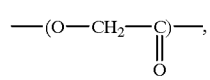
(1)

wherein the composite gas barrier film has a layer structure of polylactic acid/adhesive/ polyglycolic acid/adhesive/polysuccinate.

* * * * *

UNITED STATES PATENT AND TRADEMARK OFFICE
CERTIFICATE OF CORRECTION

PATENT NO. : 6,245,437 B1
DATED : June 12, 2001
INVENTOR(S) : Zenya Shiiki et al.

It is certified that error appears in the above-identified patent and that said Letters Patent is hereby corrected as shown below:

Column 8, claim 1,
Line 50, after "η*" insert -- of --.

Signed and Sealed this

Fifteenth Day of January, 2002

Attest:

JAMES E. ROGAN